United States Patent Office 3,487,930
Patented Jan. 6, 1970

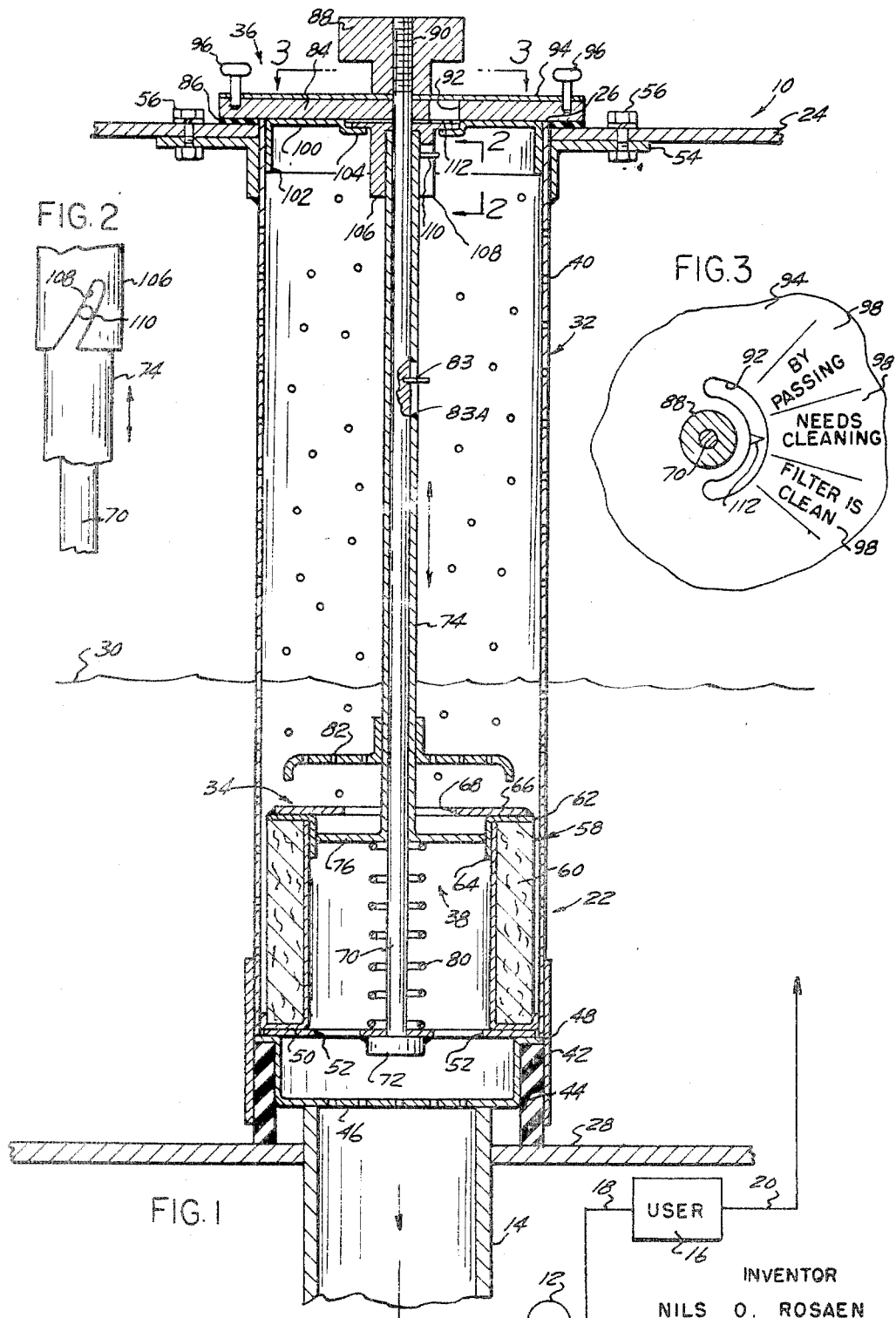

1

3,487,930
FILTER DEVICE WITH TUBULAR GUIDE MEANS
Nils O. Rosaen, Bloomfield Hills, Mich., assignor, by mesne assignments, to Parker-Hannifin Corporation, Cleveland, Ohio, a corporation of Ohio
Filed June 19, 1967, Ser. No. 646,908
Int. Cl. B01d 35/16, 35/02
U.S. Cl. 210—90                                             9 Claims

ABSTRACT OF THE DISCLOSURE

A perforated, tubular, filter guide member having its upper end mounted to the top plate of a fluid reservoir and extending into the reservoir so that its lower end is seated around the reservoir discharge opening. A cylindrical filter element received through the upper end of the tubular guide is arranged in a filtering position with its lower end adjacent the discharge opening and below the normal fluid level in the reservoir. An upright rod mounted to the lower end of the tubular guide extends upwardly through the filter to guide a spring-biased valve which opens and closes an axial by-pass opening through the filter element in response to a changing pressure differential across the filter walls.

BACKGROUND OF THE INVENTION

Field of the invention

This invention relates to a filter device adapted to be submerged in a fluid reservoir and more specifically to a filter device having a perforated elongated guide extending from the access opening to the discharge opening of the reservoir, a cylindrical filter element receivable through the perforated guide and normally disposed at its lower end in a filtering position adjacent the discharge opening, and valve means for opening and closing the upper end of the filter element to provide an axial passage from the reservoir through the filter element as the filter element becomes clogged.

Description of the prior art

Fluid systems employing a variable fluid pump as a means for inducing a positive fluid flow from a reservoir to a fluid user commonly create bubbles of air as the output of the pump changes to accommodate the varying requirements of the fluid user. These bubbles normally are entrained in the fluid flowing through the system and have a tendency to collect in pockets. The bubbles accumulate in the pockets until they eventually pass to the fluid pump or the fluid user wherein they present a potential hazard to these components.

Conventional fluid filter devices comprise a filter element disposed in a housing having an inlet and an outlet directing fluid flow through the filter. Such housings provide an ideal structure for accumulating air bubbles in pockets. Numerous filter devices of the prior art have attempted to obviate this problem by providing air bleed means for drawing off the trapped air so that it is not carried to other components of the fluid system. This approach has been only partially satisfactory and in addition increases the complexity of the fluid filter assembly.

2

It is the broad purpose of the present invention to reduce accumulation of air pockets in fluid systems by providing means for mounting a filter element in the fluid system without the necessity for the conventional housing.

SUMMARY

The preferred embodiment of the present invention is described with reference to a fluid system having structure defining a fluid reservoir including a lower reservoir plate with a discharge conduit exiting downwardly from the reservoir and an upper reservoir plate with an access opening arranged above the discharge conduit. An elongated, perforated, tubular guide member is mounted to and extends downwardly from the access opening with its lower end seated around the discharge conduit.

A guide rod extends from the lower end of the perforated guide member upwardly and through the access opening. A cylindrical filter element is disposed in a filtering position within the lower end of the tubular guide member so that normal fluid flow from the reservoir is radially into the filter element and axially downwardly to the conduit.

An elongated spring-biased tubular member slidably mounted on the guide rod has a valve member at its lower end which functions to open and close an axial bypass route through the upper end of the filter element in response to a pressure differential created across the filter walls of the element as the element becomes clogged. The up and down movement of the spring-biased valve is reflected exteriorly of the reservoir by an indicating device mounted on the lower plate of the access opening.

It can therefore be seen that the preferred embodiment of the invention provides a way to mount a filter element adjacent the discharge opening of the reservoir without the necessity for an expensively cast housing and without any structure for accumulating air bubbles entrained in the fluid.

It is therefore an object of the present invention to provide means for filtering a fluid system without an expensive housing for mounting the filter element in the system.

It is another object of the present invention to provide a filter device which is submerged in a fluid reservoir and mounted adjacent the reservoir discharge opening and comprising a cylindrical filter element, open at opposite ends, with one end connected to the discharge opening and the opposite end normally closed, and perforated mounting means exposing the outer filtering surface of the filter element to the fluid reservoir.

It is still another object of the present invention to provide an improved filter device for a fluid system having structure defining a fluid reservoir, a conduit opening to the reservoir and below the normal fluid level and means producing fluid flow from the reservoir and through the conduit including guide means for a cylindrical filter mounted within the reservoir with a lower end adjacent the conduit opening and an upper end above the normal fluid level in the reservoir; a cylindrical filter element adapted for reception through the upper end of the guide means for mounting in a filtering position adjacent the lower end thereof, the filter element having a lower end open to the conduit and an upper end providing a bypass; a guide rod mounted on the filter guide means and extending axially through the filter element; bypass valve means slidably carried on the guide rod and movable between positions opening and closing the upper bypass end of the filter element; and means normally biasing the valve means to a position closing the upper end of the filter element but permitting the valve means to open in response to a change in pressure differential across the filter.

Still further objects and advantages of the present invention will readily occur to one skilled in the art to which the invention pertains upon reference to the following detailed description.

DESCRIPTION OF THE DRAWINGS

The description refers to the accompanying drawing in which like reference characters refer to like parts throughout the several views and in which:

FIGURE 1 is a longitudinal sectional view of a filter device illustrating the present invention and with other parts of a preferred fluid system illustrated schematically;

FIGURE 2 is an enlarged view taken along lines 2—2 of FIGURE 1; and

FIGURE 3 is a view taken along lines 3—3 of FIGURE 1.

DESCRIPTION OF THE PREFERRED EMBODIMENT

Now referring to the drawing, FIGURE 1 illustrates a preferred fluid system as comprising a reservoir 10 for storing a fluid and a pump 12 for drawing fluid through a conduit 14 which has a fluid passage communicating with the reservoir 10. The pump 12 pressurizes the fluid and discharges the pressurized fluid to a fluid user 16 through a conduit 18. The fluid is then returned from the user to the reservoir 10 by a conduit 20. A preferred filter device 22 mounted within the reservoir 10 filters contaiminants from the fluid as it is drawn from the reservoir 10 through the conduit 14.

The reservoir 10 comprises a top plate 24 having an access opening 26. The conduit 14 is preferably arranged directly below the access opening 26 in a bottom plate 28, with the conduit 14 having a vertically upwardly directed inlet. The fluid level 30 is normally maintained between the upper plate 24 and the lower plate 28.

The filter device 22 comprises a tubular guide means 32, filter means 34 disposed within the tubular guide means 32, a cover assembly 36 which closes off the upper end of the tubular guide means 32 and which includes indicator means for exteriorly reflecting the condition of the filter means 34, and valve means 38 for controlling the passage of the fluid through the filter means 34.

Now considering first the tubular guide means 32, a perforated elongated, tubular member 40 having its upper end registering in the access opening 26 extends downwardly toward the outlet conduit 14 and carries a short cylindrical retainer member 42 at its lower end which extends down closely adjacent the lower plate 28. The perforated condition of the tubular member 40 permits the fluid to flow radially into the tubular member in a relatively unrestricted manner. A short cylindrical seal element 44 is retained within the retainer 42 and around the inlet to the conduit and has a length such that its lower end sealingly abuts the plate 28.

A strainer member 46 having a relatively coarse porosity is arranged closely adjacent the inlet of the conduit 14 and has an annular flange portion 48 seated on the upper edge of the seal 44 with its peripheral edges welded or otherwise fixed to the retainer 42.

An annularly shaped lower retainer plate 50 is seated on the flange 48 and has a series of annularly spaced apertures 52 to provide communication between the upper and lower sides of the retainer plate 50.

An annular flange unit 54 fixed adjacent the upper end of the tubular member 40 provides means for fastening the tubular member 40 to the top plate 24 by threaded fasteners 56. Thus it can be seen that the tubular guide means 32 provides a perforated guide way for the filter means 34 between the access opening 26 and the inlet of the conduit 14.

Now referring to the filter means 34, a cylindrical filter element 58 having an outer periphery slightly smaller than the inner guiding surface of the tubular member 40 is received through the upper end of the tubular member 40 and is passed downwardly for seating on the retainer plate 50.

The filter element 58 has a cylindrical filtering wall 60 with a porosity accommodating the fluid and the contaminants which are separated therefrom and which is finer than the porosity of the strainer element 46.

The lower end of the filter element 58 is open and registers with the inlet of the conduit 14 so that the fluid can normally pass radially through the filtering wall 60 and then axially downwardly through the apertures 52 in the lower retainer plate 50, and through the strainer 46 for discharge through the conduit 14.

An annular flange 62 is fixed to the upper end of the filtering wall 60 and has a downwardly depending cylindrical guideway 64 which extends adjacent the inner side of the filtering walls 60. An annularly shaped plate 66 is fixed to the annular flange 62 and has a central bypass opening 68. The opening 68 has a diameter less than the diameter of the cylindrical guideway 64.

The valve means 38 comprises an elongated, vertical rod 70 having an enlarged head 72 fixed as by welding to the lower retainer 50 so that the rod 70 extends axially upwardly through an aperture in the retainer 50 and through the tubular member 40. The upper end of rod 70 extends through the access opening 26 and above the upper plate 24.

An elongated tubular actuating section 74 is vertically slidably mounted on the rod 70 and has a flat valve section 76 at its lower end arranged below the plate 66. The valve section 76 has a circumference corresponding to the guideway 64 so that it is axially slidably mounted therein. The valve 76 is normally biased upwardly by a helical spring 80 which encircles the lower portion of the rod 70 with its lower end seated against the lower retainer 50 and its upper end acting against the valve 76. The spring 80 biases the valve 76 upwardly into abutment with the plate 66 where it is normally disposed when the filter element 58 is in a relatively unclogged condition. When the valve 76 is in its upper position, the bypass opening 68 is closed off, so that the fluid passes from the reservoir 10, radially through the walls of the filter element 58 and then downwardly toward the conduit 14.

The upper surface of the valve 76 is exposed to the pressure within the reservoir 10 which corresponds to the pressure on the outer surface of the filtering walls 60 The lower surface of the valve member 76 is exposed to the fluid pressure within the filter element 58 which corresponds to the pressure on the inner side of the supporting wall 60. A pressure differential across the filtering wall 60 is created as the filtering wall 60 accumulates contaminants and becomes clogged. This pressure differential develops a net downward force on the valve member 76 which acts against the spring 80. When this pressure differential achieves a predetermined level, the downward force displaces the valve member 76 away from the plate 66 and below guideway 64 so that the bypass opening 68 is opened to permit fluid flow through the opening 68 downwardly and around the circumference of valve 76 and below the guideway 64 toward the conduit 14 thereby bypassing the clogged filter wall 60.

A perforated, downwardly facing dish-shaped insert flange 82 is fixed to the tubular actuating member 74 above the valve member 76 and provides means for seating the filter element 60 against the lower retainer plate 50.

A laterally directed pin 83 is fixed to the rod 70 and extends through an elongated vertical slot 83A formed in the mid-portion of the tubular member 74. The pin 83 and slot 83A prevent the tubular member 74 from rotation on the rod 70 as it moves axially relative to the rod.

The cover assembly 36 comprises a flat cover plate 84 with a ring shaped gasket member 86 seated on the top plate 24 to close off the upper end of the access opening 26. The cover plate 84 has a central aperture to receive the upper end of the guide rod 70 so that a nut 88 can engage a threaded upper end 90 of the rod. The nut 88 is normally tightened on the rod 70 so that the cover is tightly maintained in place against top plate 24.

As best seen in FIGURES 1 and 3, an arcuate slot 92 is formed in the plate 84 and about the central axis of the plate. A plastic cover member 94 mounted on the upper side of the plate 84 by push button fasteners 96 has indicia 98 formed thereon which correspond to various positions of the valve member 76. The indicia 78 are arranged adjacent the slot 92.

A retainer member 100 fixed to the lower side of the cover plate 84 has a downwardly depending cylindrical portion 102 providing means for locating the cover plate 84 in a central position relative to the upper end of the tubular member 40. The retainer 100 also has an inwardly directed annular flange portion 104 spaced from the lower side of the cover plate 84 and providing means for seating an actuating member 106. The acting member 106 is mounted at the upper end of the tubular actuating member 74 and as best seen in FIGURE 2 has a cam slot 108 extending upwardly from its lower edge. A laterally directed pin 110 fixed to the tubular actuating member 74 extends through the slot 108. As the tubular member 74 moves between raised and lowered positions, the pin 110 acts against the sides of the slot 108 to rotate the actuating member 106 a distance corresponding to the displacement of the valve member 76 between its normal and bypass positions.

Referring again to FIGURES 1 and 3, a raised pointer portion 112 formed on the upper side of the actuating member 106 registers with the slot 92 so that the position of the actuating member 106 can be visually observed exteriorly of the reservoir 10 as the pointer section 112 registers with the indicia 98 reflecting the position of the valve member 76.

For purposes of cleaning or replacement of the filter 58, the nut 88 is separated from the upper end of the rod 70, the cap assembly 36 removed axially upwardly and away from the open end of the tubular member 40 and the filter assembly removed axially upwardly through the tubular member 40 by pulling the vertical rod 70 upwardly. Similarly, a clean filter element is inserted in its filtering position adjacent the inlet to the conduit 14 by slidably inserting the filter element, the tubular actuating member and vertical rod 70 downwardly through the tubular member 40. The insert flange 82 provides means for seating the lower end of the filter element against the lower retainer 50.

It is to be understood that I have described an improved structure for mounting a filter element in a filtering position within the reservoir and submerged below the normal fluid level in the reservoir which does not require a conventional housing so that there are no pockets permitting the accumulation of air bubbles as the fluid passes in filtering relationship through the walls of the cylindrical element. In addition, a relatively simple bypass means are provided for opening and closing a bypass route axially through the cylindrical filter element in response to a pressure differential created by the wall of the element accumulating a deposit of contaminants. The strainer 46 provides means for preventing large particles of foreign matter from passing into the conduit 14 when the filter element is being removed from the reservoir. In addition it can be seen that a filter device has been described which permits the replacement of the filter element while permitting the pump 12 to continue to produce a positive fluid flow through the system so that the fluid system does not have to be stopped in order to accommodate the replacement of the filter element.

Although I have described but one preferred embodiment of my invention it is to be understood that various changes and revisions can be made therein without departing from the spirit of the invention or the scope of the appended claims.

I claim:

1. In a fluid system having a structure defining a fluid reservoir, a conduit opening to said reservoir below the normal fluid level in said reservoir, said conduit forming a fluid passage extending from said reservoir in a direction substantially perpendicular to the surface of the fluid level in said reservoir, an elongated perforated tubular member formed symmetrically about an axis and mounted within said reservoir with a lower end circling the opening of said conduit into said reservoir and an upper end above the fluid level in said reservoir, an annular filter element adapted for reception through the upper end of said tubular member with said tubular member defining a guideway for said filter element and the axis of the filter element coinciding with the axis of said tubular member said filter element being disposed in said tubular member with its lower end adjacent said conduit opening, said lower end of said filter element providing communication between the inner side of said filter element and said conduit opening, means associated with said conduit and the lower end of the tubular member constructed and arranged so that fluid normally flows from said reservoir through said perforated member and said filter element before being discharged through said conduit, an elongated upright rod supported on the axis of said tubular member, and a bypass valve member slidably carried on said rod adjacent to the opposite end of said filter element and movable between positions opening and closing fluid communication between the inner sides of the tubular member and the filter element, and means normally biasing said valve member to said closing position.

2. A filter device as defined in claim 1, wherein said bypass valve means opens said bypass end in response to a change in the pressure differential between the inner and outer sides of the walls of said filter element.

3. A filter device as defined in claim 1, including a second filter element arranged between the discharge end of said filter element and said conduit, said second filter element having a greater porosity than said first mentioned filter element.

4. A filter device as defined in claim 1, in which said valve member has a pressure responsive surface exposed to the fluid in said reservoir and is responsive to a change in the pressure differential across the filter walls of said filter element to move said valve member in a direction opposite to the direction produced by said biasing means.

5. A filter device as defined in claim 4, including means connected to said valve member and operable to indicate the position of said valve member exteriorly of said reservoir.

6. A fluid filter device as defined in claim 5, wherein said indicating means includes an elongated tubular member axially slidably mounted on said upright rod, said valve member being mounted on the lower end of said rod, rotatable indicating means mounted on the exterior of said reservoir and cam means interconnecting the upper end of said tubular actuating member with said indicating means for transforming linear displacement of said actuating member to rotary motion.

7. A fluid filter device as defined in claim 1, wherein said reservoir structure includes a top plate having an access opening above said conduit, said tubular member extending to said access opening, said guide rod extending through said opening, a cover mounted on said top plate and over said access opening and having an aperture for receiving said rod, handle means engageable with the upper extending end of said rod and operable to tighten said cover member in position, indicator means mounted on said cover and motion transmitting means mounted on said guide rod for connecting said valve member and said indicator means.

8. A fluid filter device as defined in claim 7, and including a second filter element arranged between the discharge opening of said first mentioned filter element and the opening of said conduit.

9. A filter device as defined in claim 7, including means for attaching said tubular member to said top plate with the upper end of said tubular member registering with said access opening.

References Cited

UNITED STATES PATENTS

| | | | |
|---|---|---|---|
| 1,072,371 | 9/1913 | Stone | 210—172 |
| 1,817,572 | 8/1931 | Linley et al. | 210—172 |
| 2,605,904 | 8/1952 | Ogilvie | 210—132 |
| 3,314,544 | 4/1967 | Rosaen | 210—172 |
| 3,348,684 | 10/1967 | Wilber | 210—90 |
| 3,368,680 | 2/1968 | Bozek | 210—90 |

SAMIH N. ZAHARNA, Primary Examiner

U.S. Cl. X.R.

210—130, 172

PO-1050
(5/69)

UNITED STATES PATENT OFFICE
CERTIFICATE OF CORRECTION

Patent No. 3,487,930     Dated January 6, 1970

Inventor(s) NILS O. ROSAEN

It is certified that error appears in the above-identified patent and that said Letters Patent are hereby corrected as shown below:

IN THE SPECIFICATION

Column 2, line 32, "lower plate" should be --cover plate-- ;

Column 5, line 17, numeral "78" should be --98-- ;

line 26, "acting" should be --actuating-- .

IN THE CLAIMS

Claim 2, line 45, "valve means" should be --valve member-- ;

line 45, "bypass end" should be --opposite end-- ;

Claim 3, line 2, "discharge end" should be --lower end-- ;

Claim 8, line 3, "discharge opening" should be --lower end-- .

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents